United States Patent [19]

Kioka et al.

[11] Patent Number: 4,923,833

[45] Date of Patent: * May 8, 1990

[54] CATALYST FOR OLEFIN POLYMERIZATION AND PROCESSES FOR ITS PRODUCTION

[75] Inventors: Mamoru Kioka; Norio Kashiwa, both of Iwakuni, Japan

[73] Assignee: Mitsui Petrochemical Industries, Ltd., Tokyo, Japan

[ * ] Notice: The portion of the term of this patent subsequent to May 9, 2006 has been disclaimed.

[21] Appl. No.: 245,400

[22] PCT Filed: Dec. 25, 1987

[86] PCT No.: PCT/JP87/01034

§ 371 Date: Aug. 23, 1988

§ 102(e) Date: Aug. 23, 1988

[87] PCT Pub. No.: WO88/05057

PCT Pub. Date: Jul. 14, 1988

[30] Foreign Application Priority Data

Dec. 27, 1986 [JP] Japan ................................. 61-309280
Feb. 4, 1987 [JP] Japan ................................... 62-22594

[51] Int. Cl.$^5$ ................................................ C08F 4/64
[52] U.S. Cl. ........................................ 502/9; 502/103; 502/104; 502/117
[58] Field of Search ..................... 502/9, 103, 104, 117

[56] References Cited

U.S. PATENT DOCUMENTS

| | | | |
|---|---|---|---|
| 4,392,983 | 7/1983 | Hartshorn | 502/9 X |
| 4,424,138 | 1/1984 | Candlin et al. | 502/9 |
| 4,506,027 | 3/1985 | Invernizzi et al. | 502/9 |
| 4,530,914 | 7/1985 | Ewen et al. | 502/117 X |
| 4,663,299 | 5/1987 | Chadwick et al. | 502/9 |
| 4,701,432 | 10/1987 | Welborn | 502/103 X |
| 4,752,597 | 6/1988 | Turner | 502/104 |
| 4,794,096 | 12/1988 | Ewen | 502/117 |
| 4,808,561 | 2/1989 | Welborn | 502/104 |

*Primary Examiner*—Patrick P. Garvin
*Attorney, Agent, or Firm*—Sherman and Shalloway

[57] ABSTRACT

The solid catalyst of this invention for olefin polymerization comprises a compound of a transition metal of Group IV of the periodic table and an aluminoxane as catalyst ingredients. The catalyst is characteristic in that it has a high specific surface area, and shows very high polymerization activity on the homopolymerization or copolymerization of olefins. Polymers obtained by using the catalyst of the invention have a high bulk density, a uniform particle size, a low fine powder content and a narrow molecular weight distribution, and in the case of copolymers, a narrow composition distribution as well.

17 Claims, No Drawings

CATALYST FOR OLEFIN POLYMERIZATION AND PROCESSES FOR ITS PRODUCTION

TECHNOLOGICAL FIELD

This invention relates to a solid catalyst for polymerization of olefins, and processes for its production. More specifically, it relates to a solid catalyst for polymerization of olefins comprising a compound of a transition metal of Group IVB of the periodic table and an aluminoxane as catalyst components, and processes for its production.

BACKGROUND TECHNOLOGY

For production of an alpha-olefin polymer, especially an ethylene homopolymer or an ethylene/alpha-olefin copolymer, a method has heretofore been known to polymerize ethylene or copolymerizing ethylene with an alpha-olefin in the presence of a titanium-containing catalyst comprising a titanium compound and an organoaluminum compound or a vanadium-containing catalyst comprising a vanadium compound and an organoaluminum compound.

Catalysts comprising zirconium compounds and aluminoxanes have recently been proposed as a new Ziegler-type olefin polymerization catalyst.

Japanese Laid-Open Patent Publication No. 19309/1983 describes a process for polymerizing ethylene and at least one $C_3$–$C_{12}$ alpha-olefin in the presence of a catalyst composed of a transition metal-containing compound represented by the following formula (cyclopentadienyl)$_2$MeRHal in which R is cyclopentadienyl, $C_1$–$C_6$ alkyl, or halogen, Me is a transition metal and Hal is halogen, and a linear aluminoxane represented by the following formula Al$_2$OR$_4$(Al(R)—O)$_n$ in which R is methyl or ethyl, and n is a number of 4 to 20, or a cyclic aluminoxane represented by the following formula

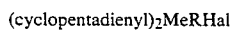

in which R and n are as defined above, at a temperature of −50° C. to 200 ° C.

Japanese Laid-Open Patent Publication No. 95292/1984 describes an invention relating to a process for producing a linear aluminoxane represented by the following formula

in which n is 2 to 40, and R is $C_1$–$C_6$, and a cyclic aluminoxane represented by the following formula

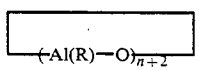

in which n and R are as defined. This patent publication discloses a specific example in which methylaluminoxane, for example, produced by the process of this patent publication is mixed with a bis(cyclopentadienyl) compound of titanium or zirconium, and an olefin is polymerized in the presence of the mixture.

Japanese Laid-Open Patent Publication No. 35005/1985 discloses a process for producing an olefin polymerization catalyst, which comprises reacting an aluminoxane represented by the following formula

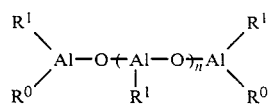

in which R is $C_1$–$C_{10}$ alkyl, and $R^0$ is $R^1$ or is bonded to represent —O—. with a magnesium compound, chlorinating the reaction product, and treating the chlorinated product with a compound of Ti, V, Zr or Cr. This patent publication describes that the above catalyst is especially suitable for the copolymerization of a mixture of ethylene and a $C_3$–$C_{12}$ alpha-olefin.

Japanese Laid-Open Patent Publication No. 35006/1985 discloses a combination of (a) a mono-, di- or tri-cyclopentadienyl compound of two or more different transition metals or its derivative and (b) an alumoxane (aluminoxane) as a catalyst system for production of a reactor blended polymer.

Japanese Laid-Open Patent Publication No. 35007/1985 describes a process for polymerizing ethylene alone or together with an alpha-olefin having at least 3 carbon atoms is polymerized in the presence of a catalyst system comprising a metallocene and a cyclic aluminoxane represented by the following formula

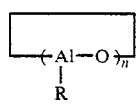

in which R is an alkyl group having 1 to 5 carbon atoms, and n is an integer of 1 to about 20, or a linear alumoxane represented by the following formula

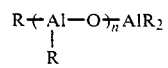

in which R and n are as defined above.

Japanese Laid-Open Patent Publication No. 35008/1985 discloses that by using a catalyst system containing at least two metallocenes and an alumoxane, polyethylene or an ethylene/$C_3$–$C_{10}$ alpha-olefin copolymer having a broad molecular weight distribution is produced.

The catalysts formed from transition metal compounds and aluminoxanes as proposed in these prior art references have much higher polymerization activity than catalyst systems formed from transition metal compounds and organoaluminum compounds known heretofore. But most of the catalyst systems proposed in the prior art are soluble in the reaction systems, and are used in many cases in a solution polymerization system. As a result, the viscosity of the polymer solution becomes very high, the polymer obtained by after-treatment of the solution has a low bulk density, and it is difficult to obtain polymers having excellent powder characteristics.

On the other hand, attempts have also been made to polymerize olefins in a suspension polymerization system or a vapor-phase polymerization system by using catalysts comprising the above transition metal compound, or the aluminoxane or both supported on a porous inorganic oxide carrier such as silica, silica-alumina or alumina.

For example, the above cited Japanese Laid-Open Patent Publications Nos. 35006/1985, 35007/1985 and 35008/1985 describe that transition metal compounds and aluminoxanes can be used as catalysts supported on silica, silica-alumina, alumina, etc.

Japanese Laid-Open Patent Publications Nos. 106808/1985 and 106809/1985 propose a process for producing a composition comprising a polyethylene-type polymer and a filler which comprises polymerizing ethylene or copolymerizing ethylene and an alpha-olefin in the presence of a product obtained by contacting treatment of a highly active catalyst component containing titanium and/or zirconium soluble in a hydrocarbon solvent and a filler, an organoaluminum compound, and a filler having affinity for polyolefins.

Japanese Laid-Open Patent Publication No. 31404/1986 proposes a process in which ethylene is polymerized, or ethylene and an alpha-olefin are copolymerized, in the presence of a mixed catalyst composed of a transition metal compound and a product obtained by reacting a trialkyl aluminum with water in the presence of silicon dioxide or aluminum oxide.

Japanese Laid-Open Patent Publication No. 276805/1986 proposes a process in which an olefin is polymerized in the presence of a catalyst comprising a reaction mixture obtained by reacting a zirconium compound and an aluminoxane with a trialkyl aluminum, and reacting the reaction mixture further with an inorganic oxide having a surface hydroxyl group such as silica.

Japanese Laid-Open Patent Publications Nos. 108610/1986 and 296008/1986 propose a process in which an olefin is polymerized in the presence of a catalyst obtained by supporting a transition metal compound such as a metallocene and an aluminoxane on a support such as an inorganic oxide. Japanese Laid-Open Patent Publication No. 296008/1986 discloses a method in which the above catalyst is prepared by recovering the reaction mixture from the liquid by vacuum evaporation or decantation.

DISCLOSURE OF THE INVENTION

It is an object of this invention to provide an olefin polymerization catalyst.

Another object of this invention is to provide an olefin polymerization catalyst comprising a compound of a transition metal of Group IVB of the periodic table and an aluminoxane as catalyst components and having a high specific surface area.

Still another object of this invention is to provide an olefin polymerization catalyst which can give an olefin polymer having a high bulk density and excellent powder properties and has high polymerization activity.

Yet another object of this invention is to provide an olefin polymerization catalyst which eliminates the inconvenience of an inorganic compound carrier being present as foreign matter in the resulting polymer as is observed with conventional catalysts supported on inorganic compound carriers, and has polymerization activity equal to, or higher than, those of conventional catalysts.

A further object of this invention is to provide processes for producing the catalysts of this invention.

Other objects of this invention along with its advantages will become apparent from the following description.

According to this invention, these objects and advantages of the invention are achieved by an olefin polymerization catalyst, characterized in that (A) it is composed of $(A_1)$ a compound of a transition metal of Group IVB of the periodic table as a catalyst component and $(A_2)$ an aluminoxane as a catalyst component, (B) the atomic ratio of the transition metal atom (M) to the aluminum atom (Al), M/Al, is in the range of 0.2 to 0.001, (C) it has an average particle diameter in the range of 5 to 200 micrometers, and (D) it has a specific surface area of 20 to 1,000 m²/g.

The catalyst of this invention is not supported on a so-called carrier.

The transition metal $(A_1)$ of Group IVB of the periodic table in the catalyst component (A) is preferably selected from titanium, zirconium and hafnium. More preferably, it is titanium or zirconium, and zirconium is especially preferred.

The compound of the transition metal of Group IVB in the catalyst component (A) may be, for example, a zirconium compound having a group containing a conjugated π electron as a ligand.

Examples of the zirconium compound are compounds of the following formula (I)

$$R^1{}_k R^2{}_l R^3{}_m R^4{}_n Zr \qquad (I)$$

in which $R^1$ represents a cycloalkadienyl group, $R^2$, $R^3$ and $R^4$ represent a cycloalkadienyl group, an aryl group, an alkyl group, a cycloalkyl group, an aralkyl group, a halogen atom, a hydrogen atom, $OR^a$, $SR^b$, $NR_2{}^c$ or $PR_2{}^d$ where $R^a$, $R^b$, $R^c$ and $R^d$ represent a hydrocarbon group such as an alkyl, cycloalkyl, aryl or aralkyl group, or a silyl group, and two $R^c$ and $R^d$ may be linked to form a ring, $k \geq 1$, $k+l+m+n=4$, and when $R^2$ is a cycloalkadienyl group, $R^1$ and $R^2$ may be bonded through a lower alkylene group.

Examples of the cycloalkadienyl group are cyclopentadienyl, methylcyclopentadienyl, ethylcyclopentadienyl, pentamethylcyclopentadienyl, dimethylcyclopentadienyl, indenyl and tetrahydroindenyl groups. Examples of the alkyl group are methyl, ethyl, propyl, isopropyl, butyl, hexyl, octyl, 2-ethylhexyl, decyl and oleyl groups. Phenyl and tolyl groups may be cited as the aryl group, and benzyl and neophile groups may be cited as the aralkyl group. Examples of the cycloalkyl group include cyclopentyl, cyclohexyl, cyclooctyl, norbornyl, bicyclononyl and alkyl-substituted derivatives of these groups. Unsaturated aliphatic groups such as a vinyl, allyl, propenyl, isopropenyl or 1-butenyl group may also be cited as examples. Examples of the halogen atom are fluorine, bromine and chlorine. Examples of the silyl group are trimethylsilyl, triethylsilyl, phenyldimethylsilyl and triphenylsilyl groups.

Examples of the zirconium compound include
bis(cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(indenyl)zirconium dibromide,
bis(cyclopentadienyl)diphenyl zirconium,
bis(cyclopentadienyl)dibenzyl zirconium,
bis(cyclopentadienyl)methoxyzirconium chloride,
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bisindenylethoxyzirconium chloride,
bis(cyclopentadienyl)ethoxyzirconium,
bis(cyclopentadienyl)butoxyzirconium,
bis(cyclopentadienyl)2-ethylhexoxyzirconium,
bis(cyclopentadienyl)phenoxyzirconium monochloride,
bis(cyclopentadienyl)cyclohexoxyzirconium chloride,
bis(cyclopentadienyl)phenylmethoxyzirconium chloride,
bis(cyclopentadienyl)methylzirconium phenyl methoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)neoethylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium diethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

Examples of the titanium compound include
bis(cyclopentadienyl)titanium monochloride monohydride,
bis(cyclopentadienyl)methyltitanium hydride,
bis(cyclopentadienyl)phenyltitanium chloride,
bis(cyclopentadienyl)benzyltitanium chloride,
bis(cyclopentadienyl)titanium chloride,
bis(cyclopentadienyl)dibenzyl titanium,
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium,
bis(cyclopentadienyl)ethoxytitanium,
ethylenebis(indenyl)titanium dichloride, and
ethylenebis(4,5,6,7-tetrahydro-1-indenyl)titanium dichloride.

The following compounds may be cited as examples of the hafnium compound.
bis(Cyclopentadienyl)hafnium monochloride monohydride,
bis(cyclopentadienyl)ethylhalfnium hydride,
bis(cyclopentadienyl)phenylhafnium chloride,
bis(cyclopentadienyl)hafnium dichloride,
bis(cyclopentadienyl)benzyl hafnium,
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride, bis(cyclopentadienyl)bis(diethylamide)hafnium,
ethylenebis(indenyl)hafnium dichloride, and
ethylenebis(4,5,6,7-tetrahydro-1-indenyl)hafnium chloride.

The catalyst component ($A_2$) is an aluminoxane.

Examples of the aluminoxane used as the catalyst component ($A_2$) are organoaluminum compounds of the following formulae (II) and (III).

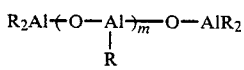

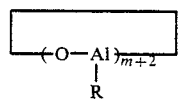

In formulae (II) and (III), R represents a hydrocarbon group or a halogenated hydrocarbon group, and m is a number of at least 2.

R represents a hydrocarbon group such as a methyl, ethyl, n-propyl, isopropyl, n-butyl or isobutyl group, preferably a methyl, ethyl or isobutyl group, especially preferably a methyl group. The hydrocarbon group may be a halogenated hydrocarbon group obtained by partial substitution with a halogen atom such as chlorine or bromine. An aluminoxane having the halogenated hydrocarbon group, namely a halogenated aluminoxane, preferably has a halogen content of not more than 40 % by weight.

m is an integer of at least 2, preferably at least 5.

The aluminoxane may be produced, for example, by the following methods.

(1) A trialkyl aluminum is added to a suspension in a hydrocarbon medium of a compound containing water of adsorption or a salt containing water of crystallization, such as magnesium chloride hydrate, copper sulfate hydrate, aluminum sulfate hydrate, nickel sulfate hydrate and cerous chloride hydrate, and reacted with the above compound.

(2) A trialkyl aluminum is directly reacted with water in a medium such as benzene, toluene, ethyl ether or tetrahydrofuran.

Of these methods, method (1) is preferably employed. The aluminoxane may contain a small amount of an organometallic component. For example, an organometallic metallic compound such as a halogen-containing organoaluminum compound or organomagnesium compound may be present besides the trialkyl aluminum.

Examples of the solvent used in preparing the aluminoxane solution are aromatic hydrocarbons such as benzene, toluene, ethylbenzene, propylbenzene, butylbenzene, xylene and chlorobenzene.

The catalyst of this invention comprises the compound of the transition metal of Group IVB of the periodic table as catalyst component ($A_1$) and the aluminoxane as catalyst component ($A_2$). It may further contain an electron donor. Examples of the electron donor include oxygen-containing compounds, for example carboxylic acids, esters, ethers, ketones, aldehydes, alcohols, phenols, acid amides and compounds having a metal atom (e.g., aluminum or silicon)-O-C bond; nitriles; amines and phosphines. The proportion of the electron donor may be, for example, usually 0 to 1 moles, preferably 0.1 to 0.6 mole, per gram-atom of the transition metal atom (M).

In the olefin polymerizing solid catalysts of this invention, the atomic ratio of the transition metal atom (M) to the aluminum metal atom (Al) is from 0.2 to 0.001, preferably from 0.05 to 0.002, more preferably from 0.02 to 0.005. If this ratio is higher than 0.2, the polymerization activity of the catalyst is decreased greatly. On the other hand, if this ratio is lower than 0.001, the polymerization activity per Al atom is reduced.

The average particle diameter of the solid catalyst for olefin polymerization in accordance with this invention is usually 5 to 200 micrometers, preferably 10 to 100 micrometers, more preferably 20 to 60 micrometers. The average particle diameter of the olefin polymerization solid catalyst is determined as an average value of the particle diameters of at least 50 catalyst particles observed under an optical microscope and selected at random.

By selecting the average particle diameter of the catalyst as above, the formation of a large amount of fine powdery polymer particles in a polymer obtained by polymerization such as vapor-phase polymerization or slurry polymerization using the olefin polymerization solid catalyst of the invention can be prevented, and the polymer has a high bulk density and excellent powder shape. Furthermore, a large amount of coarse polymer particles are not formed in the polymer, and a trouble such as clogging of the polymer particle discharge opening does not occur. The olefin polymerization solid catalyst of this invention has a specific surface area of usually 20 to 1,000 m$^2$/g, preferably 50 to 500 m$^2$/g, more preferably 100 to 300 m$^2$/g, in view of its polymerization activity.

The specific surface area of the olefin polymerization solid catalyst can be determined by utilizing adsorption and desorption of gases on the surface of the powder in accordance with the theory of the B.E.T. one-point method. A 70/30 gaseous mixture of helium and nitrogen may be cited as an example of the gases used.

According to this invention, the olefin polymerization catalyst of the invention can be prepared, for example, by some processes to be described.

Firstly, the olefin polymerization solid catalyst of this invention can be produced by (1) contacting a solution of an aluminoxane with a solvent in which the aluminoxane is insoluble or sparingly soluble, to precipitate the solid aluminoxane in suspension, and (2) contacting the resulting suspension of the solid aluminoxane with a solution of a compound of a transition metal of Group IVB of the periodic table to form solid fine particles.

This process can be carried out by adding the solvent in which the aluminoxane is insoluble or sparingly soluble to the aluminoxane solution or adding the aluminoxane solution to the solvent in which it is insoluble or sparingly soluble, to precipitate solid particles of the aluminoxane, optionally promoting precipitation of the aluminoxane by evaporating the solvent used to dissolve the aluminoxane from the above mixed solution, and then contacting the resulting suspension composed of solid particles of the aluminoxane and the solvent in which the aluminoxane is insoluble or sparingly soluble with a solution of the compound of a transition metal of Group IVB of the periodic table, thereby forming an olefin polymerization solid catalyst composed of the Group IVB transition metal compound ($A_1$) and the aluminoxane ($A_2$) as components. In any step of this process, the electron donor and other components exemplified above may be added.

Examples of the solvent in which the aluminoxane is insoluble or sparingly soluble are linear or branched aliphatic hydrocarbons such as pentane, hexane, decane, dodecane, kerosene and cyclohexane and alicyclic hydrocarbons such as cyclohexane, norbornane and ethylcyclohexane. Preferably, this solvent has a higher boiling point than the solvent used to prepare the aluminoxane solution.

Examples of the solvent used to prepare the solution of the Group IVB transition metal compound include aromatic hydrocarbons such as benzene, toluene, ethylbenzene, propylbenzene, butylbenzene and xylene and halogenated hydrocarbons such as chlorobenzene and dichloroethane.

Aliphatic or alicyclic hydrocarbons such as pentane, hexane, decane, dodecane, kerosene and cyclohexane may be cited as examples of solvents in which the Group IVB transition metal compound is insoluble or sparingly soluble.

In contacting the aluminoxane solution with the solvent in which the aluminoxane is insoluble or sparingly soluble, the solvent is used in an amount of usually 10 to 10,000 parts by weight, preferably 100 to 1,000 parts by weight, per 100 parts by weight of the aluminoxane solution. The temperature at which the contacting is carried out is usually −100° to 300° C., preferably −50° to 100° C., more preferably −30° to 50° C. The contacting is usually carried out with stirring.

The aluminoxane solution is formed of at least the aluminoxane and the solvent for dissolving it. The method of obtaining the aluminoxane solution is, for example, simple mixing of the two compounds, or mixing of the compounds while heating them. The amount of the solvent in the aluminoxane solution is 0.1 to 50 liters, preferably 0.2 to 10 liters, more preferably 0.3 to 2 liters, per gram-atom of aluminum in the aluminoxane.

In contacting the solid aluminoxane suspension and the solution of the transition metal compound, the proportion of the transition metal compound solution is usually 0.1 to 100 parts by weight, preferably 0.5 to 20 parts by weight, more preferably 1 to 10 parts by weight, per 100 parts by weight of the solid aluminoxane suspension. The contacting temperature is usually −50° to 00° C, preferably −20° to 100° C. The contacting is usually carried out with stirring.

In the above contacting, the amount of the transition metal compound used is 0.0005 to 0.2 gram-atom, preferably 0.001 to 0.1 gram-atom, more preferably 0.002 to 0.04 gram-atom, per gram-atom of aluminum in the aluminoxane suspension.

The transition metal compound solution is formed from at least the transition metal compound and the aforesaid solvent used to dissolve the transition metal compound. The method of obtaining this solution may be, for example, to mix the two compounds simply, or mix them while heating. The amount of the solvent in the transition metal compound solution is 1 to 500 liters, preferably 2 to 200 liters, more preferably 3 to 100 liters, per gram-atom of the transition metal compound.

Secondly, the olefin polymerization solid catalyst of the invention can be produced by (1) preparing a solution containing the aluminoxane and the Group IVB transition metal compound, and (2) contacting the solution with a solvent in which the aluminoxane is insoluble or sparingly soluble, thereby to precipitate solid fine particles.

This process can be carried out, for example, by adding the solvent in which the aluminoxane is insoluble or sparingly soluble to the prepared solution composed of the aluminoxane and the Group IVB transition metal compound, or adding the solution composed of the aluminoxane and the group IVB transition metal compound to the solvent in which the aluminoxane is insoluble or sparingly soluble to precipitate solid particles composed of the aluminoxane and the transition metal compound, and as required, promoting precipitation of the aluminoxane and the transition metal compound by evaporating the solvent used to dissolve the aluminoxane from the mixed solution, thereby to prepare an olefin polymerization solid catalyst composed of the Group IVB transition metal compound ($A_1$) and the aluminoxane ($A_2$) as components. In any of the steps of the process, the electron donor compound and other components exemplified above may be added.

In contacting the solution of the aluminoxane and the Group IVB transition metal compound with the solvent in which the aluminoxane is insoluble or sparingly soluble, the amount of the solvent in which the aluminoxane is insoluble or sparingly soluble is usually 10 to 10,000 parts by weight, preferably 100 to 1,000 parts by weight, per 100 parts by weight of the solution of the aluminoxane and the transition metal compound. The contacting temperature is usually −100° to 300° C., preferably −50° to 100° C., more preferably −30° to 50° C. The contacting is usually carried out with stirring.

The solution of the aluminoxane and the transition metal compound is formed of at least the aluminoxane, the transition metal compound and the above-mentioned solvent used to dissolve the aluminoxane. The method of preparing the solution is, for example, mere mixing of the two compounds or mixing them while heating. The amount of the solvent in the solution is, for example, 0.1 to 50 liters, preferably 0.2 to 10 liters, more preferably 0.3 to 2 liters, per gram-atom of aluminum in the aluminoxane.

The quantitative ratio of the aluminoxane to the transition metal in the solution is such that per gram-atom of aluminum in the aluminoxane, 0.0005 to 0.2, preferably 0.001 to 0.1, more preferably 0.002 to 0.04, of the transition metal compound is used.

Thirdly, the olefin polymerization solid catalyst of this invention can be produced by (1) preparing a solution containing the aluminoxane and the Group IVB transition metal compound, and (2) spray-drying the solution to form solid fine particles.

This process can be carried out, for example, by spraying the solution of the aluminoxane and the Group IVB transition metal compound and an inert gas heated at a temperature higher than the boiling point of the solvent used to prepare the solution by 10 to several hundred °C. as concurrent streams by using a spray dryer having two fluid nozzles while maintaining the solution at a temperature lower than the boiling point of the solvent by several to several hundred °C., thereby forming an olefin polymerization solid catalyst composed of the Group IVB transition metal compound ($A_1$) and the aluminoxane ($A_2$) as components. In any step of this process, the above-illustrated electron donor compound and other components may be added.

The solution of the aluminoxane and the transition metal compound is formed from at least the aluminoxane, the transition metal compound and the solvent used to prepare the aluminoxane solution. The method of preparing the solution is, for example, simple mixing of the two compounds, or mixing them while heating. The amount of the solvent in the solution is, for example, 0.1 to 50 liters, preferably 0.2 to 10 liters, more preferably 0.3 to 2 liters, per gram-atom of aluminum in the aluminoxane.

The quantitative ratio of the aluminoxane to the transition metal in the solution is such that per gram-atom of aluminum in the aluminoxane, 0.0005 to 0.2, preferably 0.001 to 0.1, more preferably 0.002 to 0.04, of the transition metal compound is used.

Fourthly, the olefin polymerization solid catalyst of this invention can be produced (1) spray-drying a solution of the aluminoxane to form a solid aluminoxane, and (2) contacting the solid aluminoxane with a solution of the Group IVB transition metal compound in the presence of a solvent in which the aluminoxane is insoluble or sparingly soluble.

This process can be carried out, for example, by spraying the aluminoxane solution and an inert gas kept at a temperature higher than the boiling point of the solvent used by 10 to several hundred °C. as concurrent streams by a spray dryer having two fluid nozzles while maintaining the aluminoxane solution at a temperature lower than the boiling point of the solvent used to dissolve the aluminoxane by several to several hundred °C. thereby to form solid particles of the aluminoxane, and contacting the solid aluminoxane with the solution of the Group IVB transition metal compound in the presence of the solvent in which the aluminoxane is insoluble or sparingly soluble, thereby to prepare an olefin polymerization solid catalyst composed of the Group IVB transition metal compound ($A_1$) and the aluminoxane ($A_2$) as components. In any step of the process, the above-illustrated electron donor compound and other components may be added.

In contacting the solid aluminoxane with the solution of the Group IVB transition metal compound, the Group IVB transition metal compound is used in an amount of usually 0.0005 to 0.2 gram-atom, preferably 0.001 to 0.1 gram-atom, more preferably 0.002 to 0.04 gram-atom, per gram-atom of aluminum in the solid aluminoxane. The proportion of the solvent in which the aluminoxane is insoluble or sparingly soluble is, for example, usually 100 to 100,000 parts by weight, preferably 500 to 20,000 parts by weight, more preferably 1,000 to 10,000 parts by weight, per 100 parts by weight of the solution of the Group IVB transition metal compound. The contacting temperature is usually −50° to 200° C., preferably −20° to 100° C. The contacting is usually carried out with stirring.

The aluminoxane solution used in the spray-drying is formed from at least the aluminoxane and the aforesaid solvent used to dissolve the aluminoxane. The method of obtaining the aluminoxane solution is simple mixing of the two compounds or mixing them while heating. The amount of the solvent in the aluminoxane solution is, for example, 0.1 to 50 liters, preferably 0.2 to 10 liters, more preferably 0.3 to 2 liters, per gram-atom of the aluminum in the aluminoxane.

Lastly, the olefin polymerization solid catalyst of this invention can also be produced by (1) suspending a compound of a transition metal of Group IVB of the periodic table with a solvent in which the aluminoxane is insoluble or sparingly soluble, and (2) contacting the resulting suspension with a solution of the aluminoxane to form solid fine particles.

In any step of the process, the above-illustrated electron donor compound and other components may be added.

In contacting the suspension of the Group IVB transition metal compound in the solvent in which the aluminoxane is insoluble or sparingly soluble with the aluminoxane solution, the aluminoxane solution is used in an amount of usually 0.1 to 500 parts by weight, preferably 1 to 100 parts by weight, per 100 parts by weight of the suspension of the Group IVB transition metal compound. The contacting temperature is usually −50° to 200° C., preferably −20° to 100° C. The contacting is usually carried out with stirring.

The olefin polymerization solid catalyst of the invention is prepared in accordance with this invention by the first to fifth processes described above. All these processes go through the step of precipitating or spray-drying the aluminoxane. The precipitation or spray-drying of the aluminoxane may be carried out in the presence of a trialkyl aluminum such as triisobutyl aluminum or triisoamyl aluminum.

The catalyst of this invention is effective for production of olefin polymers, particularly an ethylene polymer or a copolymer of ethylene with an alpha-olefin. Examples of olefins that can be polymerized by using the catalyst of this invention include alpha-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, 1-octadecene and 1-eicocene. The catalyst is especially suitable for polymerization of ethylene or copolymerization of ethylene with an alpha-olefin having 3 to 10 carbon atoms.

In a polymerization process using the catalyst of this invention, the polymerization of olefins is usually carried out in the vapor phase or in slurry. In the slurry polymerization, an inert hydrocarbon may be used as a solvent, or the olefin itself may serve as a solvent.

Examples of the hydrocarbon medium include aliphatic hydrocarbons such as butane, isobutane, pentane, hexane, octane, decane, dodecane, hexadecene and octadecane, cyclic hydrocarbons such as cyclopentane, methylcyclopentane, cyclohexane and cyclooctane, and petroleum fractions such as kerosene and light oil.

In carrying out the slurry polymerization method using the catalyst of this invention, polymerization temperatures of −50° to 120° C., preferably 0° to 100° C., are usually employed.

The vapor-phase polymerization using the catalyst of this invention is carried out normally at polymerization temperatures of 0° to 120° C., preferably 20° to 100° C.

In using the catalyst of this invention in the slurry polymerization method or the vapor-phase polymerization method, the proportion of the transition metal compound is, for example, $10^{-8}$ to $10^{-2}$ gram-atom/liter, preferably $10^{-7}$ to $10^{-3}$ gram-atom/liter, as the concentration of the transition metal atom in the polymerization reaction system.

In the above polymerization reaction, an aluminoxane or an organoaluminum compound represented by the general formula $$R_p^h R_q^i AlX_{3-p-q}$$

in which $R^h$ represents a hydrocarbon group having 1 to 10 carbon atoms, preferably an alkyl group having 1 to 6 carbon atoms, an alkenyl group, a cycloalkyl group or an aryl group, $R^i$ represents an alkoxy group having 1 to 6 carbon atoms or an aryloxy group, X is a halogen atom, and $3 \geq p \geq 0$, and $2 \geq q \geq 0$, may be used. The addition of an organoaluminum compound having a branched group such as triisobutyl aluminum or isoprenyl aluminum is particularly effective for increasing polymerization activity.

The polymerization is carried out usually under normal atmospheric pressure to 100 kg/cm², preferably 2 to 50 kg/cm², batchwise, semi-continuously or continuously. It is possible to carry out the polymerization in two or more stages having different reaction conditions.

Preferably, in the process of this invention, the olefin is preliminarily polymerized in the presence of the solid catalyst prior to the main polymerization of the olefin. The preliminary polymerization is carried out, for example, by polymerizing 1 to 1,000 g, preferably 5 to 500 g, more preferably 10 to 200 g, of the alpha-olefin per gram-atom of the Group IVB transition metal compound (A) in the solid catalyst. Examples of the olefin used in the preliminary polymerization include ethylene and alpha-olefins having 3 to 20 carbon atoms such as propylene, 1-butene, 4-methyl-1-pentene, 1-hexene, 1-octene, 1-decene, 1-dodecene and 1-tetradecene. Ethylene or both ethylene and a small amount of the alpha-olefin, are preferred.

The preliminary polymerization temperature is −20° to 70° C., preferably −10° to 60° C., more preferably 0° to 50° C.

The above preliminary polymerization may be carried out batchwise or continuously under atmospheric pressure or elevated pressures. The preliminary polymerization may be carried out in the presence of a molecular weight controlling agent such as hydrogen. The amount of the molecular weight controlling agent, however, should preferably be limited to an amount in which at least a prepolymer having an intrinsic viscosity [η], measured in decalin at 135° C., of at least 0.2 dl/g, preferably 0.5 to 20 dl/g, can be produced.

The preliminary polymerization is carried out in the absence of a solvent or in an inert hydrocarbon medium. In view of operability, it is preferred to carry out the preliminary polymerization in an inert hydrocarbon medium. Examples of the inert hydrocarbon medium used in the preliminary polymerization may be the same as those exemplified above as the solvent in which the aluminoxane is insoluble or sparingly soluble.

The concentration of the solid catalyst in the preliminary polymerization reaction system in the preliminary polymerization is, for example, $10^{-6}$ to 1 gram-atom/liter, preferably $10^{-4}$ to $10^{-2}$ gram-atom/liter, as the concentration of the transition metal atom in the solid catalyst.

EXAMPLES

The following examples specifically illustrate the present invention.

Synthesis of Aluminoxane

A 400 ml glass flask equipped with a stirrer and thoroughly purged with nitrogen was charged with 37 g of $Al_2(SO_4)_3 \cdot 14H_2O$ and 125 ml of toluene. The flask was cooled to 0° C., and then 125 ml of toluene containing 50 ml of trimethylaluminum was added dropwise over 1 hour. The mixture was then heated to 40° C. over 3 hours, and the reation was continued at this temperature for 48 hours. After the reaction, the reaction mixture was subjected to solid-liquid separation by filtration. Low-boiling substances were removed from the separated liquid by using an evaporator. Toluene was added to the remaining solid and the desired aluminoxane was recovered as a toluene solution.

The molecular weight of the aluminoxane, determined from freezing point depression in benzene, was 884, and it had a degree of polymerization of 15.

EXAMPLE 1

[Preparation of a solid catalyst]

A 300 ml pressure-reducible reactor equipped with a stirrer was charged with 67 ml of a toluene solution of the above methylaluminoxane in an amount corresponding to 100 millimoles of Al atoms, and at room temperature, 100 ml of purified n-decane was added over the course of about 0.5 hour to precipitate methylaluminoxane. While the inside of the reactor was reduced in pressure to 4 torr by using a vacuum pump, the temperature of the inside of the reactor was raised to 35° C. over about 3 hours, thereby removing toluene in the reactor and further precipitating the methylaluminoxane. The reaction solution was filtered through a filter to remove the liquid phase portion. The solid portion was suspended in n-decane, and 5 ml of a toluene solution containing 0.2 millimole of bis(cyclopentadienyl)zirconium dichloride was added. After mixing at room temperature for about 1 hour, the liquid phase portion was removed by using a filter, and an olefin polymerization solid catalyst was prepared.

The resulting solid catalyst contained 0.6% by weight of Zr and 47% by weight of Al, and had an average particle diameter, determined by microscopic observation, of about 30 micrometers. It had a specific surface area, measured by using MONOSORB (made by Yuasa Ionics Co., Ltd.) and a carrier gas composed of argon and nitrogen in a ratio of 70/30, of 171 m²/g.

[Preliminary Polymerization]

A 400 ml reactor equipped with a stirrer was charged with 100 ml of purified n-decane and 0.1 millimole, as Zr, of the solid catalyst. Then, ethylene was fed for 1 hour at a rate of 4 Nl/hour. During this time, the temperature was maintained at 20° C. After supplying ethylene, the reaction system was purged with nitrogen, and the product was washed once with purified hexane, suspended in hexane, and stored in a catalyst bottle.

[Polymerization]

A 2-liter autoclave fully purged with nitrogen was charged with 250 g of sodium chloride as a dispersing agent, and while it was heated to 90° C., the inside of the autoclave was subjected to pressure reduction treatment for 2 hours so that the pressure of the inside of the autoclave reached below 50 mmHg. The temperature of the autoclave was then lowered to 75° C., and the inside of the autoclave was purged with ethylene. Then, the solid catalyst component subjected to the above preliminary polymerization was added in an amount of 0.01 millimole calculated as zirconium atoms. The autoclave was then sealed up, and 50 Nml of hydrogen was added. The autoclave was pressurized with ethylene so that its inside pressure reached 8 kg/cm²-G. The stirring speed was increased to 300 rpm, and the polymerization was carried out at 80° C. for 1 hour.

After the polymerization, all the polymer and sodium chloride were taken out from the autoclave, and poured into about 1 liter of water. By stirring the mixture for about 5 minutes, almost all sodium chloride dissolved in water, and only the polymer came afloat on the water surface. The floating polymer was recovered, washed fully with methanol, and dried overnight at 80° C. under reduced pressure. The amount of the polymer yielded was 147.8 g. It had an MFR of 0.9 dg/min., an apparent bulk density of 0.44 g/ml and an $\overline{Mw}/\overline{Mn}$ of 2.5.

EXAMPLE 2

[Preparation of a solid catalyst]

A 300 ml pressure-reducible reactor equipped with a stirrer was charged with 67 ml of a toluene solution of the above methylaluminoxane in an amount corresponding to 100 millimoles of Al atoms and 5 ml of a toluene solution containing 0.2 millimole of bis(cyclopentadienyl)zirconium dichloride, and 100 ml of purified n-decane was added over the course of about 1 hour at room temperature with stirring to precipitate particles composed of methylaluminoxane and bis(cyclopentadienyl)zirconium dichloride. While the inside of the reactor was reduced in pressure to 4 torr by using a vacuum pump, the temperature of the reactor was increased to 35° C. over the course of about 3 hours. As a result, toluene was evaporated from the reactor and the particles composed of methylaluminoxane and bis(cyclopentadienyl)zirconium dichloride were precipitated. The reaction suspension was transferred to a filter, and the liquid-phase portion was removed. The solid portion was thus recovered.

The resulting solid catalyst contained 0.7% by weight of Zr and 45% by weight of Al and had an average particle diameter, determined by microscopic observation, of about 27 micrometers and a specific surface area of 166 m²/g. Using the resulting solid catalyst, preliminary polymerization and polymerization of ethylene in the vapor phase were carried out in the same way as in Example 1. The results are shown in Table 1.

COMPARATIVE EXAMPLE 1

A solid catalyst was prepared as in Example 2 except that toluene was evaporated without prior use of n-decane in which the methylaluminoxane was sparingly soluble. Using the solid catalyst, preliminary polymerization and vapor-phase polymerization of ethylene were carried out.

Specifically, a 300 ml pressure-reducible reactor equipped with a stirrer was charged with 67 ml of a toluene solution containing methylaluminoxane in an amount corresponding to 100 millimoles of Al atoms and 5 ml of a toluene solution containing 0.2 millimole of bis(cyclopentadienyl)zirconium dichloride. Then, while the pressure of the inside of the reactor was reduced to 4 torr with stirring, the temperature of the inside of the reactor was raised to 35° C. over about 3 hours. The toluene in the reactor was completely evaporated to give solid particles composed of methylaluminoxane and bis(cyclopentadienyl)zirconium dichloride.

The solid catalyst contained 0.3 % by weight of Zr and 45% by weight of Al. When the shape of the catalyst particles were observed under a microscope, the particle distribution was very broad ranging from fine particles having a size of about 1 micrometer to coarse large particles having a size of several hundred micrometers. Their shape was non-uniform, and particles having a shape close to a sphere were not at all observed. The solid catalyst had a specific surface area of 4.3 m²/g. By the same operation as in Example 1, preliminary polymerization and vapor-phase polymerization of ethylene were carried out. The results are shown in Table 1.

EXAMPLE 3

A solid catalyst was prepared in the same way as in Example 1 except that the solvent used to dissolve bis(cyclopentadienyl)zirconium chloride was changed from toluene to 1,2-dichloroethane. Preliminary polymerization and vapor-phase polymerization of ethylene using the solid catalyst were carried out as in Example 1. The results are shown in Table 1.

EXAMPLE 4

A solid catalyst was prepared in the same way as in Example 1 except that the solvent used to dissolve the methylaluminoxane was changed from toluene to ethylbenzene. Preliminary polymerization and vapor-phase polymerization of ethylene were carried out as in Example 1. The results are shown in Table 1.

TABLE 1

| Run No. | Catalyst composition (wt. %) Zr | Al | Catalyst particle size (μm) | Specific surface area (m²/g) | Polymerization method | Polymerization activity (g · PE/mMZr) | Apparent bulk density (g/cm³) |
|---|---|---|---|---|---|---|---|
| Example 1 | 0.6 | 47 | 30 | 171 | Vaporphase method | 14,800 | 0.44 |
| Example 2 | 0.7 | 45 | 27 | 166 | " | 13,900 | 0.43 |
| Comparative Example 1 | 0.3 | 45 | 1–100 | 4.3 | " | 2,300 | 0.21 |
| Example 3 | 0.6 | 46 | 28 | 168 | " | 14,000 | 0.44 |
| Example 4 | 0.6 | 47 | 31 | 165 | " | 13,600 | 0.43 |

EXAMPLE 5

Ethylene and hexene-1 were copolymerized in the vapor phase. Specifically, the copolymerization was carried out in the same way as in Example 1 except that the solid catalyst subjected to preliminary polymerization as described in Example 1 was used, 10 ml of hexene-1 was added after the addition of the catalyst components, and the polymerization time was shortened to 20 minutes from 1 hour. The results are shown in Table 2.

EXAMPLE 6

Slurry polymerization was carried out using the solid catalyst of Example 1. Specifically, a 2-liter autoclave purged fully with ethylene was charged with 450 g of liquefied isobutane, and the temperature was elevated to 60° C. The solid catalyst component subjected to preliminary polymerization as described in Example 1 was added in an amount of 0.008 millimole calculated as zirconium atoms, and then 80 ml of 4-methyl-1-pentene and 50 Nml of hydrogen were added. Then, ethylene was introduced, and the pressure of the inside of the autoclave was maintained at 3.5 kg/cm$^2$-G for 1 hour. During this time, the temperature was controlled to 70° C. After the lapse of 1 hour, about 2 ml of methanol was added to the autoclave to stop the polymerization completely, followed by pressure releasing. The resulting polymer was recovered and dried overnight at 80° C. under reduced pressure. The amount of the polymer yielded was 216.7 g. The polymer had an MFR of 0.8 dg/min., an apparent bulk density of 0.42 g/ml, a density of 0.912 g/ml and an $\overline{Mw}/\overline{Mn}$ of 2.8.

EXAMPLE 7

Three hundred milliliters of a toluene solution containing 500 millimoles, as aluminum atoms, of methylaluminoxane, while being kept at 50° C., was sprayed together with a concurrent stream of hot nitrogen at 120° C. by using a spray dryer having two fluid nozzles with a diameter of 0.25 mm. Consequently, toluene was evaporated, and solid aluminoxane particles were obtained. Five milliliters of a toluene solution containing 0.2 millimole of bis(cyclopentadienyl)zirconium dichloride was added with stirring to a suspension composed of 5.8 g of the resulting aluminoxane particles and 100 ml of n-decane. They were mixed at room temperature for about 1 hour. The liquid-phase portion was removed by a filter, and a solid catalyst for olefin polymerization was prepared.

The solid catalyst contained 0.6% by weight of Zr and 46% by weight of Al and had an average particle diameter, determined by microscopic observation, of about 47 micrometers and a specific surface area of 126 m$^2$/g. Preliminary polymerization and vapor-phase polymerization of ethylene were carried out in the same way as in Example 1. The results are shown in Table 2.

EXAMPLE 8

Three hundred milliliters of a toluene solution containing 500 millimoles, as aluminum atoms, of methylaluminoxane and 1 millimole of bis(cyclopentadienyl)zirconium dichloride, while being kept at 50° C., was sprayed together with a concurrent stream of hot nitrogen at 120° C. by using a spray dryer having two fluid nozzles with a diameter of 0.25 mm. Consequently, toluene was evaporated, and solid catalyst particles composed of methylaluminoxane and bis(cyclopentadienyl)zirconium dichloride were obtained.

The solid catalyst contained 0.6% by weight of Zr and 47% by weight of Al and had an average particle diameter, determined by microscopic observation, of about 52 micrometers and a specific surface area of 110 m$^2$/g. Preliminary polymerization and vapor-phase polymerization of ethylene were carried out in the same way as in Example 1. The results are shown in Table 2.

EXAMPLE 9

A solid catalyst was prepared in the same way as in Example 1 except that the amount of bis(cyclopentadienyl)zirconium dichloride used was changed from 0.2 millimole to 0.33 millimole. Using the resulting solid catalyst, preliminary polymerization and vapor-phase polymerization of ethylene were carried out in the same way as in Example 1. The results are shown in Table 2.

EXAMPLE 10

A solid catalyst was prepared in the same way as in Example 1 except that the amount of bis(cyclopentadienyl)zirconium dichloride used was changed from 0.2 millimole to 0.5 millimole. Using the resulting solid catalyst, preliminary polymerization and vapor-phase polymerization of ethylene were carried out in the same way as in Example 1. The results are shown in Table 2.

EXAMPLE 11

Ethylene was polymerized in the vapor phase in the same way as in Example 10 except that in the vapor-phase polymerization of Example 10, 1.3 millimoles of triisobutyl aluminum was added immediately before the solid catalyst component subjected to preliminary polymerization was added. The results are shown in Table 2.

TABLE 2

| Run No. | Catalyst composition (wt. %) Zr | Catalyst composition (wt. %) Al | Catalyst particle size (μm) | Specific surface area (m$^2$/g) | Polymerization method | Polymerization activity (g · PE/mMZr) | Apparent bulk density (g/cm$^3$) | Density (g/cm$^3$) |
|---|---|---|---|---|---|---|---|---|
| Example 5 | 0.6 | 47 | 30 | 171 | Vaporphase method | 10,100 | 0.41 | 0.918 |
| Example 6 | " | " | " | " | Slurry method | 27,100 | 0.42 | 0.912 |
| Example 7 | 0.6 | 46 | 47 | 126 | Vaporphase method | 8,100 | 0.40 | — |
| Example 8 | 0.6 | 47 | 52 | 110 | " | 9,200 | 0.42 | — |
| Example 9 | 0.9 | 46 | 31 | 158 | " | 16,300 | 0.45 | — |
| Example 10 | 1.1 | 45 | 31 | 163 | " | 10,700 | 0.43 | — |
| Example 11 | " | " | " | " | " | 14,300 | 0.44 | — |

UTILIZABILITY AND EFFECT IN INDUSTRY

The present invention provides a catalyst for olefin polymerization having very high polymerization activity in the homopolymerization and copolymerization of ethylene and being capable of producing a polymer or a copolymer which has a uniform particle size, a low fine powder content and a narrow molecular weight distribution and in the case of copolymerization, a narrow composition distribution as well.

We claim:

1. A process for producing an unsupported catalyst for olefin polymerization, which comprises:
   (1) contacting a solution of an aluminoxane in a first solvent with a second solvent in which the aluminoxane is insoluble or sparingly soluble, to precipitate solid aluminoxane to form a suspension, and
   (2) contacting the resulting suspension of solid aluminoxane with a solution of a compound of a transition metal of Group IVB of the Periodic Table in a third solvent, to form solid fine particles.

2. The process of claim 1, wherein said aluminoxane solution contains 0.1 to 50 liters of said first solvent per gram-atom of aluminum in the aluminoxane.

3. The process of claim 2, wherein said aluminoxane solution is contacted with 10 to 10,000 parts by weight of said second solvent per 100 parts by weight of said aluminoxane solution.

4. The process of claim 1, wherein said compound of a transition metal of Group IVB is present in an amount of 0.0005 to 0.2 gram-atom per gram-atom of aluminum in the aluminoxane suspension.

5. The process of claim 4, wherein said solution of a compound of a transition metal of Group IVB contains 1 to 500 liters of said third solvent per gram-atom of transition metal compound.

6. The process of claim 1, wherein said contacting of said aluminoxane solution with said second solvent further comprises evaporating said first solvent from said suspension.

7. A process for producing an unsupported catalyst for olefin polymerization, which comprises:
    (1) preparing a solution containing an aluminoxane and a compound of a transition metal of Group IVB of the Periodic Table in a first solvent, and
    (2) contacting said solution with a second solvent in which the aluminoxane in insoluble or sparingly soluble to thereby precipitate solid fine particles.

8. The process of claim 7, wherein said solution contains 0.0005 to 0.2 gram-atom of said compound of a transition metal of Group IVB per gram-atom of aluminum in said aluminoxane.

9. The process of claim 8, wherein said solution contains 0.1 to 50 liters of said first solvent per gram-atom of aluminum in said aluminoxane.

10. The process of claim 7, wherein said solution is contacted with 10 to 10,000 parts by weight of said second solvent per 100 parts by weight of said solution.

11. The process of claim 7, wherein said contacting of said solution with said second solvent further comprises evaporating said first solvent therefrom.

12. A process for producing an unsupported catalyst for olefin polymerization, which comprises:
    (1) spray-drying a solution of an aluminoxane in a first solvent to form a solid aluminoxane, and
    (2) contacting said solid aluminoxane with a solution of a compound of a transition metal of Group IVB of the Periodic Table in a second solvent in the presence of a third solvent in which said aluminoxane is insoluble or sparingly soluble.

13. The process of claim 12, wherein said solution of an aluminoxane contains 0.1 to 50 liters of said first solvent per gram-atom of aluminum in said aluminoxane.

14. The process of Claim 12, wherein said compound of a transition metal of Group IVB is present in an amount of 0.0005 to 0.2 gram-atom per gram-atom of aluminum in said aluminoxane.

15. The process of claim 12, wherein said third solvent is present in an amount of 100 to 100,000 parts by weight per 100 parts by weight of said solution of a compound of a transition metal of Group IVB of the Periodic Table.

16. A process for producing an unsupported catalyst for olefin polymerization, which comprises:
    (1) suspending a compound of a transition metal of Group IVB of the Periodic Table in a first solvent in which an aluminoxane is insoluble or sparingly solvent, and
    (2) contacting the resulting suspension with a solution of said aluminoxane in a second solvent to form solid fine particles.

17. The process of claim 16, wherein said solution of said aluminoxane is present in an amount of 0.1 to 500 parts by weight per 100 parts by weight of said suspension of a compound of a transition metal of Group IVB.

* * * * *